UNITED STATES PATENT OFFICE.

FREDERICK HOGE, OF ZOUG, SWITZERLAND.

LEADING-IN WIRES FOR INCANDESCENT ELECTRIC LAMPS.

1,422,443. Specification of Letters Patent. Patented July 11, 1922.

No Drawing. Application filed February 26, 1919. Serial No. 279,418.

*To all whom it may concern:*

Be it known that I, FREDERICK HOGE, a subject of Great Britain, residing at Zoug, Switzerland, have invented certain new and useful Improvements in Leading-in Wires for Incandescent Electric Lamps (for which I have filed applications in Great Britain on Dec. 4, 1917; in Switzerland, Jan. 29, 1918, Patent No. 27704; in Germany, Feb. 9, 1918, application Sch. 52577; in Austria Feb. 9, 1918; in Hungary, Feb. 11, 1918, application No. 4838), of which the following is a specification.

My invention has for its object to provide efficient and economical leading-in wires, or conductors, for incandescent electric lamps, high vacuum apparatus, and the like, which wires, or conductors, will satisfactorily replace the platinum wires, or conductors, ordinarily used. According to my invention we take wires of iron, or steel, or of an alloy thereof, and apply thereto a mixture of glass with tungsten (or a metal belonging to the same group composing tungsten, molybdenum, vanadium and uranium) or an oxide of tungsten (or of a metal of the same group) the said mixture being formed into a paste by means of water, or other suitable liquid. I prefer to use alcohol, or like spirit for the purpose, as a paste made therewith dries quickly. My invention may be performed, for instance, by taking powdered metallic tungsten, or preferably tungsten oxide ($WO_2$) and intimately mixing it with powdered ordinary glass, in the proportion, for instance, of eight parts by weight of tungsten, (or of tungsten oxide), and one part by weight of powdered glass, employing alcohol for bringing the mixture into the condition of a paste. This paste is then spread on, or otherwise applied to wires of nickel-steel alloy which have been welded, or soldered, to the wires which are to lead the electric current to and from the filament. The coating of the wires with the paste may be effected in a suitable way. Heat is then applied, in a suitable way, to melt the paste on the wire so that the wires (or any desired parts thereof to which the paste may have been applied) are provided with an adherent sheath of tungsten and glass. This heating may be done, for example, by raising the wires to a sufficient temperature by an electric current. The wires thus prepared may be sealed, in any ordinary, or suitable, way, into the lamps, or other devices, or articles, with which they are to be used.

What I claim is:—

For incandescent lamps, high vacuum apparatus and the like, a leading in wire or conductor made of ignoble cheap metal having a coating composed of eight parts by weight of tungsten and one part by weight of fused glass.

In testimony whereof I affixed my signature.

FREDERICK HOGE.